Oct. 20, 1964  V. W. CURTIS  3,153,509
MANUALLY MANEUVERABLE ROW CROP SPRAYER
Filed Feb. 20, 1963  2 Sheets-Sheet 1

Vernie W. Curtis
INVENTOR.

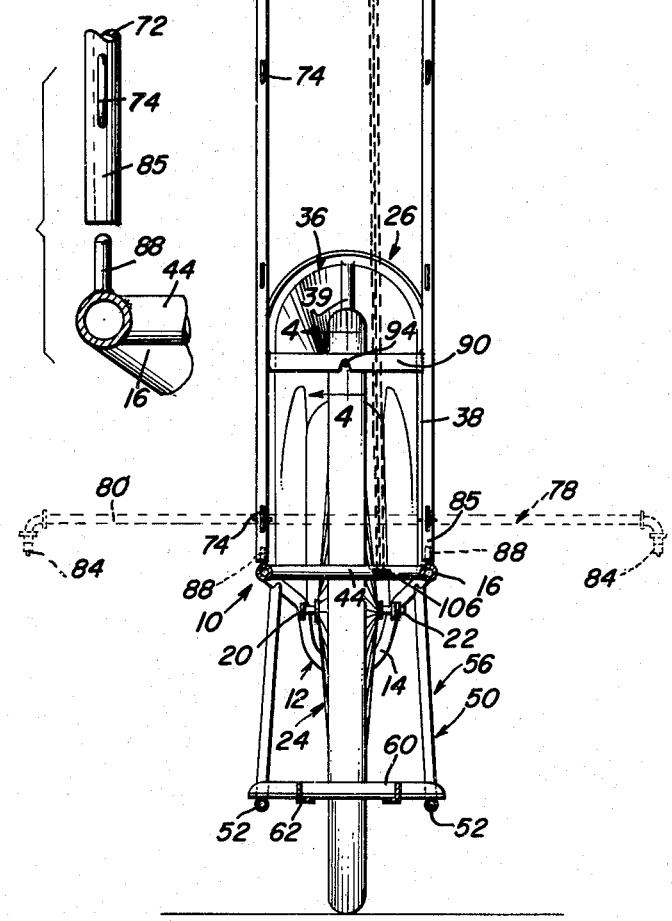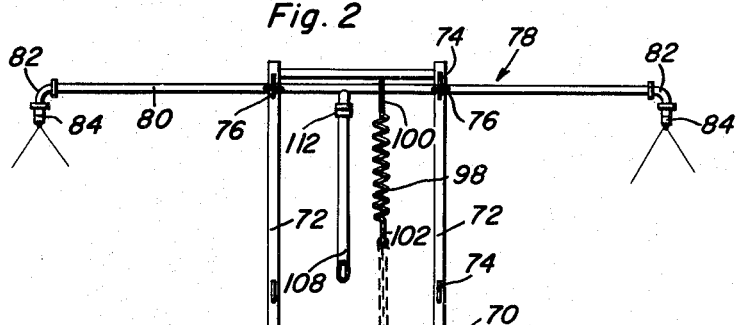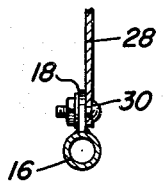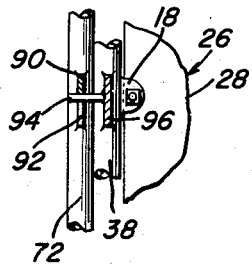

3,153,509
MANUALLY MANEUVERABLE ROW CROP SPRAYER
Vernie W. Curtis, Rte. 1, Tompkinsville, Ky., assignor of one-half to Walter L. Curtis, Tompkinsville, Ky.
Filed Feb. 20, 1963, Ser. No. 259,888
10 Claims. (Cl. 239—172)

The present invention relates to a portable manually maneuverable and controllable self-contained insecticide transporting and crop spraying device which is expressly designed and adapted for home gardening and small farm use.

Briefly, the present invention comprises a portable carriage embodying a horizontally elongated frame which is preferably, but not necessarily, U-shaped in plan. The relatively narrow bight portion is located at the forward or leading end and the free rearward ends of the rail-like limbs are provided with appropriate handles which permit the required pushing, pulling and handling of the carriage. To accomplish the desired ends the forward end portion is provided with a tire-equipped single wheel of desired size which functions much in the manner of a single-wheeled wheelbarrow. A specially designed hollow hood is mounted atop said forward end and cooperates with and shields the upper half-portion of the wheel. A tank-equipped insecticide container is cradled and supported on the median portion of the carriage frame and supplies pressurized fluid insecticide to spaced-apart nozzles by way of a nozzle positioning and spreader member. The latter is vertically adjustable on a vertically elongated upright, more specifically, a specially constructed mast which is removably mounted on the frame.

A general objective is to improve upon and reduce the number of component parts embodied in the over-all structure and to do so in a manner which contributes to the efficiency of use and desired end results and also renders the structure less costly, this to the mutual advantage of manufacturers, wholesalers, retailers and users.

As will be hereinafter more fully understood the carriage is readily maneuverable in that the single directing and carting wheel thereon is amply large in diameter, is equipped with a rubber tire, and is mounted for unhampered rotation in anti-friction bearing means on the cooperating frame members. The upper half-portion of the wheel is housed and effectually shielded in the hollow portion of the elongated sheet material hood with the result that the hood provides not only a fender but a mudguard and minimizes the likelihood of the wheel getting wet and becoming balled up with mud.

Of further significance is the fact that the forwardly sloping hood is not only a fender-type guard for the shielded portion of the wheel, it is primarily a carriage directing, crop-parting and piloting fender which reliably and with certainty, pilots and noses itself unimpeded between the crops of the rows to the left and right thereof. Accordingly, and with a relatively clean dry free-turning wheel and a companion hood-type fender therefor the likelihood of crop-leaf entanglement is minimized.

In addition to the streamlined hood facilitating travel of the carriage in the aisles between the rows of crops other problem-solving objectives have been taken into account and carried into effect. To ends desired the median or intermediate portion of the carriage frame is provided with auxiliary underslung frame means which provides a cradle-like hanger, the latter serving to confine and support a pump-equipped insecticide container. By confining and suspending the container and associated component parts in proximity to the single maneuverable wheel easy handling and carting of the device and self-contained facilities is assured.

Furthermore, and this, too, is significant, the hood is conformable to and effectually mounted atop the narrowed forward end of the carriage frame with its rearward open end abutting and cooperating with the lower attachable and detachable members of an upright. This upright constitutes a mast and is constructed so that it adequately and adjustably supports a raisable and lowerable spreader which functions as both a supply manifold and a carrier for terminal depending nozzles with the nozzles spaced apart so that rows of crops up to five feet in height and ranging down to two feet can be satisfactorily sprayed.

It is also within the purview of the invention to so construct the median portion of the carriage frame that it lends itself not only to the use of the readily applicable and removable upright or mast but to the attachment thereto of a wheelbarrow box.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a view on a larger scale taken at right angles to FIGURE 1 and showing the structure in a direction from right to left in FIGURE 1 with parts appearing in section;

FIGURE 3 is an enlarged detail section on the plane of the section line 3—3 of FIGURE 1;

FIGURE 4 is a similar fragmentary detail sectional view enlarged and on the section line 4—4 of FIGURE 2;

FIGURE 5 is a fragmentary detail sectional and elevational view illustrating certain of the structural details.

Figure 1:
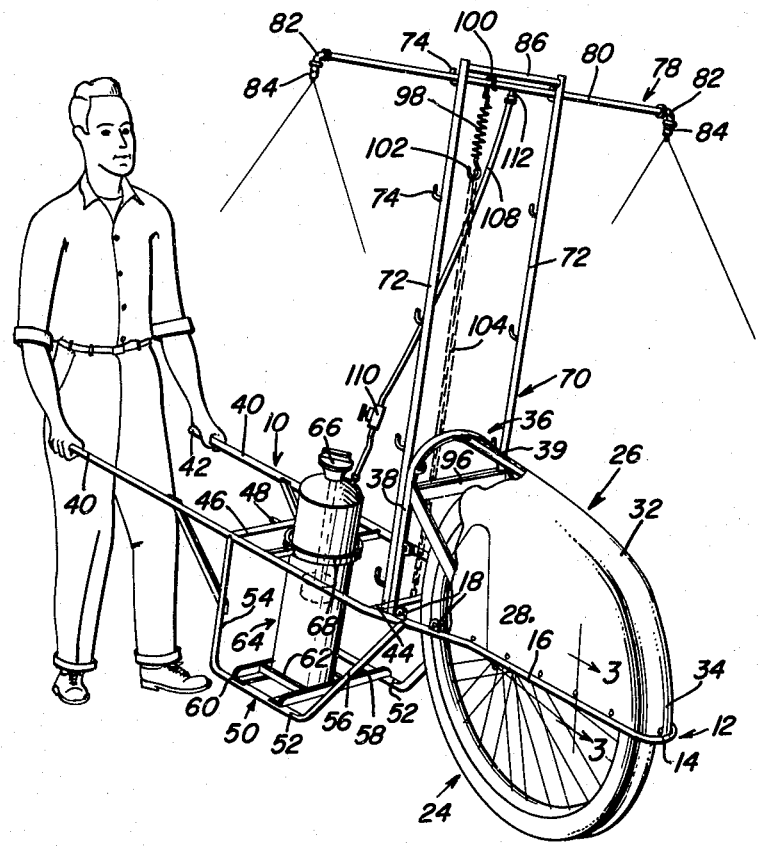
FIGURE 1 is a view in perspective of a manually maneuverable self-contained and ready-to-use row crop sprayer constructed in accordance with the principles of the invention and illustrating the structural details with particularity and with the carriage elevated and ready to move, portions of the hood being broken away to show otherwise hidden parts.

Referring now to the drawings, more particularly to FIGURE 1, it will be evident that the aforementioned elongated U-shaped frame of the carriage is denoted, as an entity, by the numeral 10. This part is preferably of one-piece construction and is fashioned from lightweight aluminum or equivalent structural tubing. The forward end portion 12 is relatively narrow and embodies a curvate bight portion 14 and companion coplanar rearwardly extending limbs or limb portions 16 which are provided at longitudinally spaced points with upstanding apertured ear-like lugs 18. This U-shaped portion serves to accommodate appropriate anti-friction bearings 20 (see FIGURE 2, not detailed) which in turn serve to support aligned axles or journals 22 carried by the tire-equipped free turning ground engaging wheel 24. The upper half-portion of this wheel is accommodatingly housed and shielded within the hollow portion of the elongated sheet material hood or fender 26. The lower edges of the vertical skirt portions 28 are separably bolted or correspondingly attached as at 30 (see FIGURE 3) to the assembling and retaining lugs 18. The forwardly downwardly sloping median lengthwise channel portion 32 is fashioned into a piloting nose 34 and noses and wedges its way between the rows of crops to the left and right of the aisle which is being traversed by the sprayer. To achieve a more satisfactory structural arrangement of parts a relatively short inverted U-shaped adapter frame or yoke 36 is mounted in a vertical position on the median portions of the limbs and the depending legs 38 thereof are permanently attached to their respective limbs. This adapter frame 36 in conjunction with a lengthwise complemental brace 39 provides a satisfactory and rigid mounting for the hood. Not only does the hood serve as piloting means it also serves as a fender-type mudguard for the wheel 24 and functions to keep it from getting too wet from the downwardly spraying insecticide.

The rearward end portions 40 of the limbs 16 of the frame 10 are sufficiently far apart that the walking attendant is permitted to assume the walk-along operating position shown in FIGURE 1. The free ends are provided with appropriate bicycle-type handgrips 42. There is a horizontal cross brace 44 between the limbs located just rearwardly of the periphery of the wheel 24. There is also a second cross brace at 46 provided with a central rearwardly projecting stud 48 which serves a purpose to be hereinafter described. These two cross braces 44 and 46 are mentioned in that they mark and isolate the aforementioned median portion of the over-all frame 10. This is a significant portion of the frame for the reason that it is equipped with featured improvements. For example, there is the underslung cradle 50 comprising a pair of spaced parallel depending hangers each having a horizontal intermediate portion 52, a rearward vertical portion 54 and an upwardly sloping forward portion 56, these portions 54 and 56 integrally connected with the respective portions of the limbs or arms 16. These paired hangers cooperate in defining a cradle which is provided with forward and rearward parallel angle irons 58 and 60 and complemental crosswise angle irons 62 which conjointly provide a rigidified chair-like seat or support for the bottom of the applicable and removable liquid insecticide containing tank 64. This tank in practice is provided with a built-in pump (not detailed) and which is operated by a suitable plunger. Since this pump-type container is a marketed item and is shown in a number of prior reference patents it is not described in detail here. It is stabilized and held in place by an embracing ring 68 in the manner illustrated. By properly positioning this cradle-like hanger and loaded tank close behind the wheel it functions to balance the weight of the over-all carriage and makes handling and maneuvering of the carriage easy for the user thereof.

The intermediate portion of the U-frame 10 also provides a satisfactory mount and support for the vertically disposed upright means, alternatively a mast, denoted generally by the numeral 70. Specifically, this mast comprises a pair of spaced parallel vertically elongated tubular members 72 provided with oppositely arranged vertically spaced positioning and attaching eyes 74 which serve to accommodate spaced attaching eyes 76 provided on the intermediate portion of the detachable as well as vertically raisable and lowerable nozzle-equipped cross-head or spreader member 78. This latter member comprises an elongated tube and provides a fluid receiving and distributing manifold 80, the same being provided at its outer end with elbows 82 which serve to support the readily applicable and removable spray heads 84. These spray heads are equipped with suitable nozzles the particular construction of which is not too important here but will of course be taken care of by the manufacturer. The objective is to provide the median portion of the spreader member 78 with means 76 for detachably and adjustably mounting the same at different elevations 74 on the mast. The upper end of the members 72 of the mast are connected together by a rigidifying rod 86. The lower hollow ends 85 of these members provide suitable sockets which are fitted removably over upstanding attaching and retaining studs 88 (see FIGURE 5) which are provided for that purpose. In other words, this means 70, considered as a unit, is readily applicable and removable and when in position the crosspiece 90 thereon is provided with a keeper notch 92 which fits over an assembling and anchoring stud 94 which is mounted on and carried by a complemental coplanar crosspiece 96 (FIGURE 4) which is provided between the aforementioned legs 38 of the yoke 36.

Holddown means for the nozzle-carrying spreader and manifold 78 is thought to be desirable. This means comprises (see FIGURES 1 and 2) a coil spring 98 having a hook 100 at the upper end which is releasably engageable over the intermediate portion of the member 78. A second hook 102 is provided at the lower end of the spring and serves to permit the connection thereto of an upper link of a depending chain 104. The lower links are detachably and separably connectible to suitable anchoring means provided therefor as at 106 in FIGURE 2. This chain and spring means serves to assist in keeping the means 78 in the position in which it is placed when being used. This means 78 may be at the top as shown in full lines in FIGURE 1 or at the bottom as shown in phantom lines in FIGURE 2. It may occupy anyone of the selected intermediate positions therebetween depending on the height of the crops which are being sprayed.

In order to deliver the pressurized insecticide fluid an appropriate delivery tube or hose 108 is provided. This tube as shown in FIGURE 1 has its lower end communicatively connected with a discharge nipple on the container adjacent to which is a cut-off valve 110. The upper end portion is connected to a delivery neck or nipple 112 on the intermediate portion of the manifold or spreader member 78. With the device rigged for use in the manner illustrated in FIGURE 1 it will be evident that the walking attendant simply catches hold of the handgrips 42 and pushes the carriage forwardly through a selected aisle, that is, between the rows of crops to the left and right of said aisle. The forward movement is greatly assisted by the fact that the visor-like hood or fender prevents entanglement of obstructing and over-hanging crops with the wheel and other component parts which trail behind it. Also the hood provides a mudguard and minimizes the likelihood of the wheel balling up with mud. With this streamlined machine and with the nozzle supporting and spreading means 78 supported at the desired elevation, it will be evident that rows of crops of varying heights and widths may be effectually sprayed. Other features and advantages have already been set forth in the preceding description. Under the circumstances it is believed that a more extended description of the construction and mode of operation is unnecessary.

Figure 6:
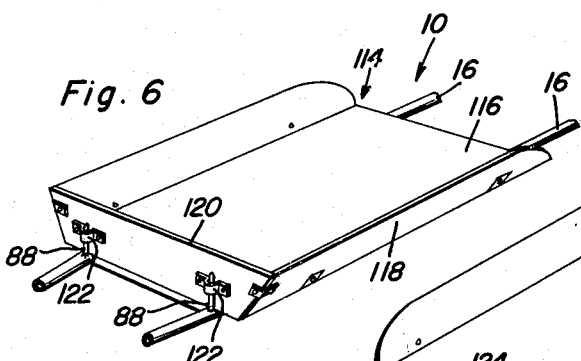
FIGURES 6 and 7 are perspective views of the optionally applicable and removable wheelbarrow box.
Figure 7:
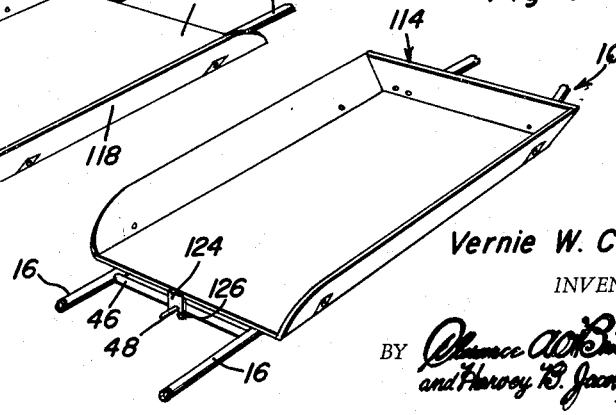

It is to be added, however, that by removing the container 64 and hose line, and parts 70 and 78 the user can convert the device or machine to a satisfactory wheelbarrow. The barrow beds or boxes are shown at 114 in FIGURES 6 and 7. A suitable bottom 116 with marginal walls 118 is constructed from appropriate plywood or the like and these walls are suitably clipped together. The forward vertical wall 120 is provided with socket-like adapters or brackets 122 which can be fitted over the aforementioned studs 88, whereby to thus temporarily hold the box 114 in place. For further stability a depending ear or lug 124 is provided at the lefthand end or rear in FIGURE 7 and this lug is provided with a keeper notch 126 to engage over the keeper pin 148. The manner of converting from a sprayer to a wheelbarrow is believed to be reasonably clear and a more extended explanation is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For home gardening and small farm use, a portable manually maneuverable and controllable self-contained insecticide transporting and two-row crop spraying vehicle comprising: a mobile carriage embodying a one-piece horizontally elongated U-shaped frame having forward and rearward end portions and a median portion between said end portions, a single vertically disposed ground-engaging carriage carting wheel operatively and rotatably mounted on said forward end portion and adapted to travel along an aisle between two adjacent rows of crops, the rearward ends of the limbs of said frame having handle means, an upstanding carriage directing hood mounted atop the limbs of said forward end portion and partially enclosing and shielding a cooperating upper half-portion of said wheel, said hood being elongated, free of exterior movement impeding projections and accordingly exteriorly smooth and being shaped in a manner to define a crop-parting fender and serving to pilot itself unimpeded between the crops of the rows to the lengthwise left and right thereof, an insecticide container underslung hanger, means seating and removably supporting said container from the median portion of said frame, said hanger means being proximal to but rearwardly of the rear end of said hood, upstanding support means on said frame for adjustably supporting the spray heads in an elevated plane removably mounted above the crops which are to be sprayed, and manifold means for distributively delivering the insecticide from said container to said spray heads, said spray heads being carried by said manifold means.

2. The structure defined in claim 1 and wherein said hanger means embodies a pair of like depending spaced parallel oppositely disposed U-shaped hanger members joined to and hung integrally from median portions of their respective limbs, the bight portions of said hanger members being longitudinally straight and disposed in spaced parallel coplanar relationship, a pair of spaced parallel angle members interposed between said U-shaped hanger members and joined to the bight portions thereof and cooperating therewith in defining a container seating and support member, said hanger members being of a height equal to the lower half-portion of said wheel and said bight portions being adapted to rest on the ground whereby said hanger means has the additional function of a stand for supporting the U-shaped frame and component parts thereon when the frame is at rest.

3. A portable manually maneuverable and controllable insectiticide transporting and crop spraying machine comprising, in combination, an elongated U-shaped frame adapted when at rest to assume a generally horizontal position, the forward end of said frame embodying a bight portion and having bearing means on opposed limb portions, a wheel arranged between said opposed limb portions and having journals rotatable in said bearing means, a machine piloting and directing hood mounted atop said limb portions, open at its bottom and unobstructedly open at its rear end and enclosing the upper half-portion of said wheel and constituting a protective shield therefor, said limb portions having free rearward ends provided with handgrips, an underslung hanger mounted on the intermediate portions of said limb portions having seating and supporting means for positioning and retaining a pump-equipped insecticide container, median portions of said limbs at the rearward ends of said hood being provided with upstanding studs, and an upstanding attachable and detachable mast having paired interconnected hollow uprights, the lower hollow ends of said uprights being detachably connected with their respective studs.

4. The structure defined in claim 3, and wherein said mast is vertically elongated and provided with a right angularly disposed elongated manifold provided at its outer ends with spray nozzles and provided on an intermediate portion with means for detachably and adjustably mounting the same on the uprights of said mast.

5. A portable manually maneuverable and controllable insecticide transporting and crop spraying machine comprising, in combination, an elongated substantially U-shaped frame embodying a bight portion and having opposed elongated limb portions having wheel bearings, a wheel arranged between said opposed limb portions and having journals mounted for rotation in said bearings, a piloting and directing hood open at its bottom and rear end and mounted atop said bight portion and limb portions and enclosing the upper half-portion of said wheel and constituting a protective shield therefor, said limb portions having free rearward ends provided with handgrips, an underslung hanger on the intermediate portions of said limb portions having means for positioning and retaining a pump-equipped insecticide container, median portions of said limbs adjacent the rearward open end of said hood being provided with upstanding studs, a vertically elongated mast having socket members at the lower end thereof fitted removably over their respective studs, a single horizontally elongated manifold having a median portion disposed at right angles to and detachably and adjustably mounted on said mast, said manifold being provided at respective outer ends thereof with depending spray nozzles, and a valved insecticide line having a lower end adapted to be connected communicatively with said container and an upper end thereof communicatively connected with a median portion of said manifold.

6. A portable manually maneuverable and controllable insecticide transporting and crop spraying machine comprising, in combination, an elongated substantially U-shaped frame adapted when in use to assume a generally horizontal position, the forward end of said frame embodying a bight portion and having bearing means on opposed limb portions, a wheel arranged between said opposed limb portions and having journals mounted for rotation in the bearing means, a piloting and directing hood mounted atop said limb portions, said hood being open at its bottom and rear end and enclosing the upper half-portion of said wheel and constituting a protective shield for said upper half-portion, said limb portions having free rearward ends provided with handgrips, an underslung hanger on the intermediate portions of said limb portions having means for positioning and retaining a pump-equipped insecticide container, median portions of said limb portions at the rearward ends of said hood being provided with upstanding studs, a vertically disposable elongated mast embodying a pair of hollow uprights, the lower ends of said uprights providing socket members and telescopically and removably receiving their respective studs with the studs detachably supporting the upright, means connecting the upper ends of the uprights to each other, supporting hooks on said uprights, a horizontally elongated manifold detachably and adjustably mounted on selective ones of said hooks, ends of the manifold extending beyond the respective uprights and being provided with depending spray nozzles.

7. A portable manually maneuverable and controllable insecticide transporting and crop spraying machine comprising, in combination, an elongated substantially U-shaped frame embodying a bight portion and opposed elongated limb portions having wheel bearings, a wheel arranged between said opposed limb portions and having journals mounted for rotation in said bearings, a piloting and directing hood open at its bottom and rear end and mounted atop said bight portion and limb portions and enclosing the upper half-portion of said wheel and constituting a protective shield therefor, said limb portions having free rearward ends provided with handgrips, an underslung hanger on the intermediate portion of said limb portions having means for positioning and retaining a pump-equipped insecticide container, median portions of said limbs adjacent to the rearward open ends of said hood being provided with upstanding studs, a vertically elongated mast having socket members at the lower end thereof fitted removably over their respective studs, a single horizontally elongated manifold having a median portion disposed at right angles to and detachably and adjustably mounted on said mast, said manifold being provided at respective outer ends thereof with depending spray nozzles, and a valved insecticide line having a lower end adapted to be connected communicatively with said container and an upper end thereof communicatively connected with a median portion of said manifold, and in combination, holddown means comprising a hook detachably connected to the manifold, an anchoring chain connectible at a lower end to said U-shaped frame and connected at an upper end to a hook provided therefor on said spring.

8. For home gardening and small farm use, a portable manually maneuverable and controllable self-contained insecticide transporting and crop spraying vehicle comprising a mobile carriage embodying a horizontally elongated U-shaped frame having forward and rearward end portions and an intervening median portion, a single vertically disposed rubber tired ground engaging carriage carting wheel operatively and rotatably mounted between the limbs at said forward end portion, the rearward ends of the limbs of said frame having handle means, a carriage directing crop-parting hood mounted atop the forward end portions of said limbs enclosing and shielding a cooperating upper half portion of said wheel, said hood being elongated and wholly free of externally projecting impediments and defining a fender which is adapted to pilot itself unimpeded between the crops of the rows to the lengthwise left and right thereof, an insecticide container, underslung hanger means suspended from a portion of said frame adjacent the rearward end of said hood and balancing and supporting said container from the median portion of said frame, spray heads, means on said frame for adjustably supporting the spray heads in an elevated plane above the crops which are to be sprayed, and means for distributively delivering the insecticide from said container to said spray heads, said hanger embodying seating means on which said container is removably seated, a positioning and stabilizing ring supported above said seating means embracing and retaining the container in a given upright position, a flexible fluid delivery line connected at its lower end with the container and provided with a cutoff valve, the upper end of said line being communicatively connected to said insecticide delivering and distributing means.

9. A portable manually maneuverable and controllable insecticide transporting and crop spraying machine comprising, in combination, an elongated substantially U-shaped frame adapted when in use to assume a generally horizontal position, the forward end of said frame embodying a bight portion and having bearing means on opposed limb portions, a wheel arranged between said opposed limb portions and having journals mounted for rotation in the bearing means, a piloting and directing hood mounted atop said limb portions, said hood being open at its bottom and rear end and enclosing the upper half-portion of said wheel and constituting a protective shield for said upper half-portion, said limb portions having free rearward ends provided with handgrips, an underslung hanger on intermediate portions of said limb portions having means for positioning and retaining a pump-equipped insecticide container, the rearward open end of said hood having a built-in inverted U-shaped yoke, said yoke having depending legs secured to median portions of the respectively cooperable limbs of said U-shaped frame, a horizontal crosspiece fixed to and spanning the space between said legs, a vertically elongated mast embodying a pair of uprights joined together at their upper ends, the lower portions of said upright being aligned with and abutting uprights being aligned with and abutting the respective legs of said yoke and having their lower ends residing atop said limbs, a second crosspiece, the latter carried by median portions of said uprights and abutting and being separably connected to said first-named crosspiece, a horizontal hollow elongated manifold at right angles to said uprights and mounted for vertical adjustment thereon, said manifold having end portions extending outwardly and beyond their respective uprights, and spray nozzles carried by the outer ends of said manifold.

10. The structure defined in claim 9 and wherein said underslung hanger comprises a pair of oppositely disposed correspondingly constructed U-shaped members having spaced parallel coplanar bight portions and upstanding arms, said arms being connected to cooperating limb portions, and container seating and stabilizing means cooperatively associated with said U-shaped hanger members, and a stabilizing ring supported above said seating means and carried by said limb portions and adapted to embrace and assist in holding said container in a given upright operating position.

References Cited in the file of this patent
UNITED STATES PATENTS

| | | |
|---|---|---|
| 1,050,669 | Lee | Jan. 14, 1913 |
| 1,128,856 | Cornwall et al. | Feb. 16, 1915 |
| 2,275,594 | Perry | Mar. 10, 1942 |
| 2,347,267 | Jowers | Apr. 25, 1944 |
| 2,521,313 | Sproat | Sept. 5, 1950 |

FOREIGN PATENTS

| | | |
|---|---|---|
| 533,870 | France | Dec. 21, 1921 |